United States Patent
Biskeborn

(10) Patent No.: US 6,580,586 B1
(45) Date of Patent: Jun. 17, 2003

(54) MAGNETIC TRANSDUCER WITH RECESSED MAGNETIC ELEMENTS

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/991,601

(22) Filed: Nov. 21, 2001

(51) Int. Cl.[7] .................. G11B 5/187; G11B 5/39
(52) U.S. Cl. ........................................ 360/319
(58) Field of Search ...................... 360/319, 320, 360/313, 110, 231, 235.4

(56) References Cited

U.S. PATENT DOCUMENTS

| | | | |
|---|---|---|---|
| 3,662,500 A | 5/1972 | Mendel | 451/37 |
| 4,837,923 A | 6/1989 | Brar et al. | 29/683.18 |
| 5,687,045 A * | 11/1997 | Okai et al. | 360/120 |
| 5,761,790 A | 6/1998 | Carr et al. | 29/603.15 |
| 5,769,689 A | 6/1998 | Cossaboon et al. | 451/41 |
| 5,772,780 A | 6/1998 | Homma et al. | 134/7 |
| 5,851,846 A | 12/1998 | Matsui et al. | 438/17 |
| 5,898,542 A * | 4/1999 | Koshikawa et al. | 360/122 |
| 5,905,613 A | 5/1999 | Biskeborn et al. | 360/130.21 |
| 5,935,869 A | 8/1999 | Huynh et al. | 438/692 |
| 5,952,243 A | 9/1999 | Forester et al. | 438/693 |
| 6,038,106 A | 3/2000 | Aboaf et al. | 360/317 |
| 6,046,099 A | 4/2000 | Cadien et al. | 438/622 |
| 6,219,200 B1 * | 4/2001 | Waki et al. | 360/122 |
| 6,366,428 B1 * | 4/2002 | Yamanaka et al. | 360/126 |
| 2002/0105758 A1 * | 8/2002 | Chiba et al. | 360/235.4 |

* cited by examiner

*Primary Examiner*—Hoa T. Nguyen
*Assistant Examiner*—Julie Anne Watko
(74) *Attorney, Agent, or Firm*—G. Martin Knight

(57) ABSTRACT

A magnetic transducer with selected elements recessed from the surface of the transducer is disclosed. The magnetic sensor element is recessed below its surrounding gap material and the second shield (S2) is preferably recessed below the level of the gap material. Recessing the selected elements below the surrounding ceramic material, results in superior resistance to physical distortion resulting from the action of the moving magnetic media. Applicant discloses two methods for producing magnetic transducers with recessed elements according to the invention. One method uses a lapping medium which chemically etches the selected material more aggressively than the surrounding material resulting in the selected material being recessed from the surface of the transducer. For transducers in which the magnetic sensor element and the second (S2) are made from alloys of nickel and iron, an acidic lapping medium is preferred to achieve the desired structure. A second method for fabricating the transducer structure according to the invention uses sputter-etching.

9 Claims, 6 Drawing Sheets

MAGNETIC TRANSDUCER WITH RECESSED MAGNETIC ELEMENTS

FIELD OF THE INVENTION

The invention relates to the field of thin film magnetic transducers (heads) and to methods for fabricating thin film magnetic transducer with recessed magnetic elements.

BACKGROUND OF THE INVENTION

A typical prior art disk drive system 10 is illustrated in FIG. 1. In operation the magnetic transducer 11, usually called a "head" is attached to an arm or actuator 13 and flies above the rotating disk 16. A voice coil motor (VCM) (not shown) pivots the actuator 13 to position the magnetic transducer 11 over selected circumferential tracks on the disk 16. The disk 16 is attached to spindle 18 that is rotated by a spindle motor 24. The disk 16 comprises a substrate 26 on which the magnetic medium 21 is deposited. The magnetic medium 21 is used to record the magnetic transitions written by the magnetic transducer 11 in which information is encoded. A tape based storage system uses a magnetic transducer in essentially the same way as a disk drive, with the moving tape being used in place of the rotating disk 16.

The magnetic transducer 11 is composed of elements that perform the task of writing magnetic transitions (the write head 23) and reading the magnetic transitions (the read head 12) as illustrated in the merged head shown in FIG. 2. The electrical signals to and from the read and write heads 12, 23 travel along conductive paths (leads) (not shown) which are attached to or embedded in the actuator 13. Typically there are two leads each for the read and write heads 12, 23.

FIG. 2 is a midline section perpendicular to the air bearing surface of one type of prior art magnetic transducer 11 for use in a disk drive 10. The components of the read head 12 are the first shield (S1), two insulation layers 107, 109 which surround the magnetoresistive sensor element 105 and the second shield 104 (P1/S2). The sensor element 105 may include multiple layers of material in addition to the magnetoresistive material as is the case in a spin valve sensor. This type of magnetic transducer 11 is called a "merged head" because the P1/S2 layer 104 serves as a shield for the read head 12 and a pole piece for the write head 23. The yoke also includes a second pole piece 103 (P2) which connects with P1/S2 104 at the "back gap" (BG). The P2 103 confronts the P1 104 across the write gap layer 42 to form the write gap 43 at the air bearing surface (ABS). The coil 37 in this particular prior art head is deposited on a layer of resist 106 which is used to define the zero throat height (ZTH) by forming a step on the gap layer 42. FIG. 3 is symbolic illustration of a prior art tape storage system 203 which utilizes a tape cartridge 202. The tape storage system 203 uses a magnetic transducer assembly 211 which is positioned between fixed tape support pins 228, 229. The electrical signals to and from the magnetic transducer assembly 211 are processed by channel electronics 231. The tape cartridge 202 includes reels 220, 221 on which magnetic tape 222 is stored. The magnetic tape 222 is supported by pins 225, 227. In operation the magnetic tape 222 is positioned in contact or near contact to magnetic transducer assembly 211 as the tape is moved in either direction to and from reels 220, 221. The magnetic transducer assembly 211 indudes a plurality of magnetic transducers to read and write multiple tracks across the width of the tape simultaneously. Separate magnetic transducers are used for each track.

FIG. 4 is a midline section illustrating of a type of prior art magnetic transducer assembly 211 used in tape storage systems. The transducer assembly 211 includes symmetrical components which allow simultaneous reading and writing. These are illustrated as left transducer 51A with its closure pieces 71A and right transducer 51B with its closure pieces 71B. The tape 222 moves from left to right as well as right to left. The left transducer 51A and right transducer 51B are respectively included in the left module 53A and the right module 53B which are supported by the left u-beam 55A and the right u-beam 55B.

FIG. 5 is a section of a transducer 51 such as might be used for the left and/or right transducers 51A, 51B. The relative sizes are not shown to scale, since the wide range of sizes would make the drawing unclear. The section is taken parallel to the tape bearing surface (not shown). The substrate 61 supports undercoat 63 which is an insulating material such as alumina. The first shield (S1) 65 is a magnetically permeable material such as Sendust which has been used in tape heads for many years and is well known in the art. Sendust is a nonductile material. The magnetoresistive sensor element 67 is separated from S1 65 by the first gap 66. The second gap 68 separates the magnetoresistive sensor element 67 from the second shield 69. The magnetoresistive sensor element 67 may be a single layer or multiple layers. The first and second gaps 66, 68 are typically alumina, as is the overcoat 70. The second shield 69 may be a ferromagnetic material such as permalloy (80 at. % nickel, 20 at. % iron) which is ductile. The closure piece 71 is placed on top of the overcoat 70.

FIG. 6 is a section of the prior art transducer 51 taken perpendicular to the tape bearing surface 72. The prior art lapping process results in the tape bearing surface 72 being substantially planar around the magnetoresistive sensor element 67 with each of the components being essentially flush with the tape bearing surface 72. A problem with prior art heads which results from the action of the moving magnetic media is that elements such as the magnetoresistive sensor element 67 and the second shield 69 which are made from ductile material can be mechanically distorted by having the surface material pushed and pulled into a nonplanar, driftlike shape.

Thin film deposition processes used to fabricate heads typically create a film which conforms to the surface topography on which it is being deposited. When the thin film structures of differing materials are etched, the resulting surface may be significantly nonplanar. The deposition of a subsequent conformal film leaves the surface in a nonplanar state. A planarization process which is commonly used in both thin film head and semiconductor fabrication is called chemical-mechanical polishing (CMP). Both acidic and basic solutions have been suggested for use in CMP to speed up the rate of material removal. The prior art of fabricating magnetic transducers (heads) has included lapping the surface of the heads to present a smooth surface to the magnetic media. The lapping process is performed on rows of heads which have been cut from the wafer after all of the thin film structures have been formed. Lapping the heads is typically a mechanical process, but use of a slurry with an alkaline pH is suggested by Brar, et al., in U.S. Pat. No. 4,837,923. The purpose is to add an etching action in addition the mechanical abrasion. A pH of nine is said to be preferable. The result is claimed by Brar, et al., to be a smooth surface with the pole tip exposed and flush with the surrounding material.

SUMMARY OF THE INVENTION

Applicant discloses a novel magnetic transducer which has selected elements recessed from the surface of the transducer. The magnetic sensor element is recessed below its surrounding gap material and the second shield (S2) is preferably recessed below the level of the gap material. The magnetic sensor element and the second shield are typically made from ductile material. Recessing the softer and more ductile elements below the surrounding ceramic material, results in superior resistance to physical distortion resulting from the action of the moving magnetic media. Applicant discloses two methods for producing magnetic transducers with recessed elements according to the invention. One method uses a lapping medium which chemically etches the selected material more aggressively than the surrounding material resulting in the selected material being recessed from the surface of the transducer. Since lapping is typically already performed as a part of the fabrication process, no additional process steps are required by this method. For transducers in which the magnetic sensor element and the second (S2) are made from alloys of nickel and iron, an acidic lapping medium is preferred to achieve the desired structure. A second method for fabricating the transducer structure according to the invention uses sputter-etching. When the thin film structure for the magnetic transducer is subjected to the working gas atoms in a sputtering chamber, the magnetic material sputter-etches more rapidly than the surrounding ceramic material resulting in the magnetic material being recessed from the surface of the transducer. The sputter etching is performed after the conventional lapping process and before or after the individual transducers are sliced from the rows.

Heads according to the invention are preferably used in tape drive systems, but use in disk storage systems is feasible.

DETAILED DESCRIPTION OF THE INVENTION AND THE PREFERRED EMBODIMENTS

Figure 1:
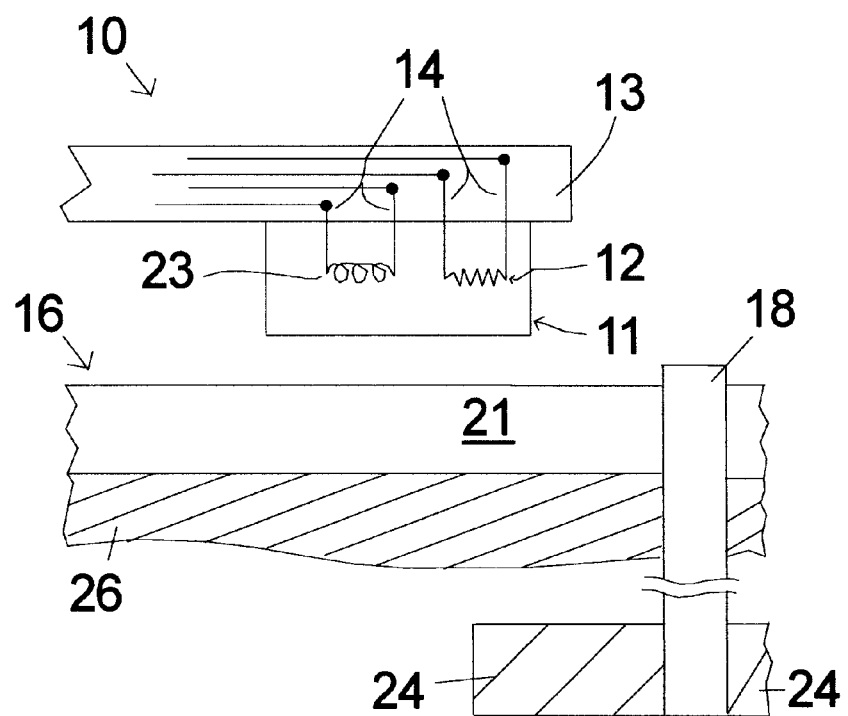
FIG. 1 is a symbolic illustration of a prior art disk drive in which the head of the invention can be embodied, showing the relationships between the head and associated components.
Figure 2:
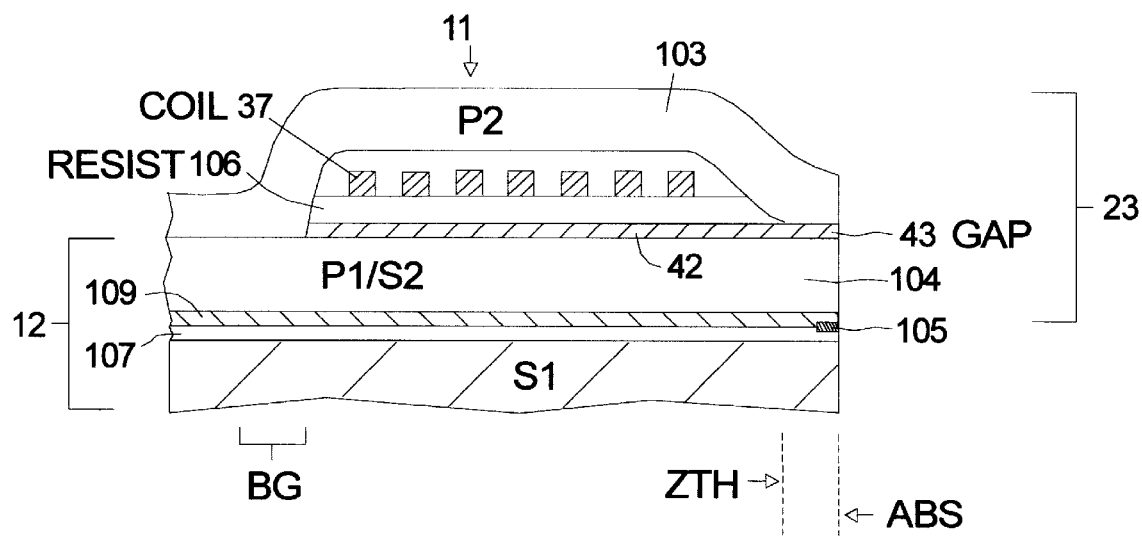
FIG. 2 is a section, perpendicular to the air bearing surface, of a prior art magnetic transducer intended for use in a disk drive.
Figure 3:
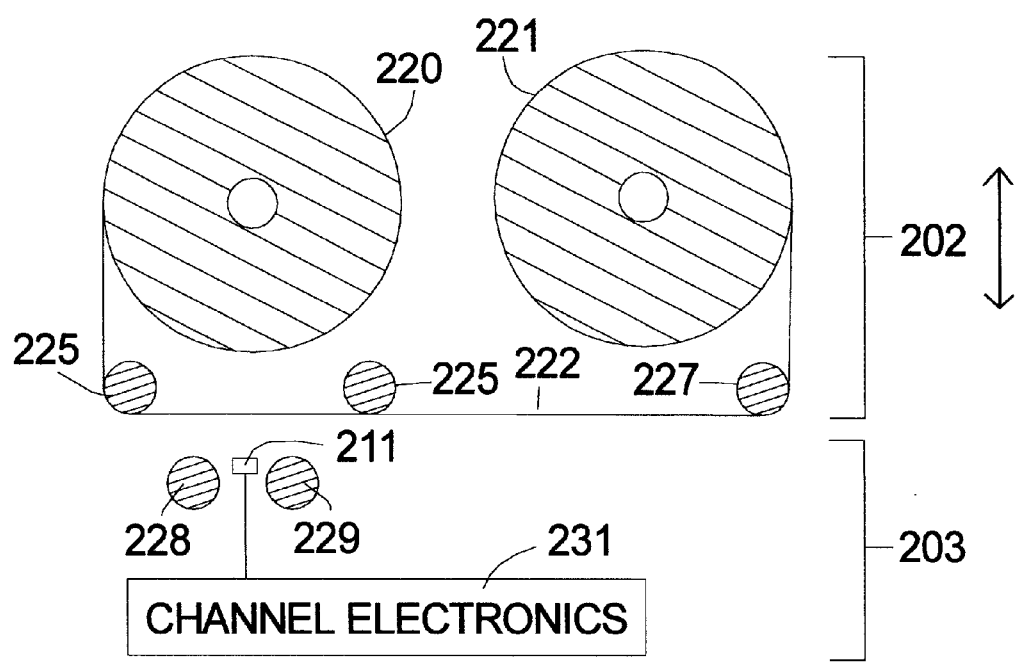
FIG. 3 is a symbolic illustration of a prior art tape storage system and a tape cartridge.
Figure 4:
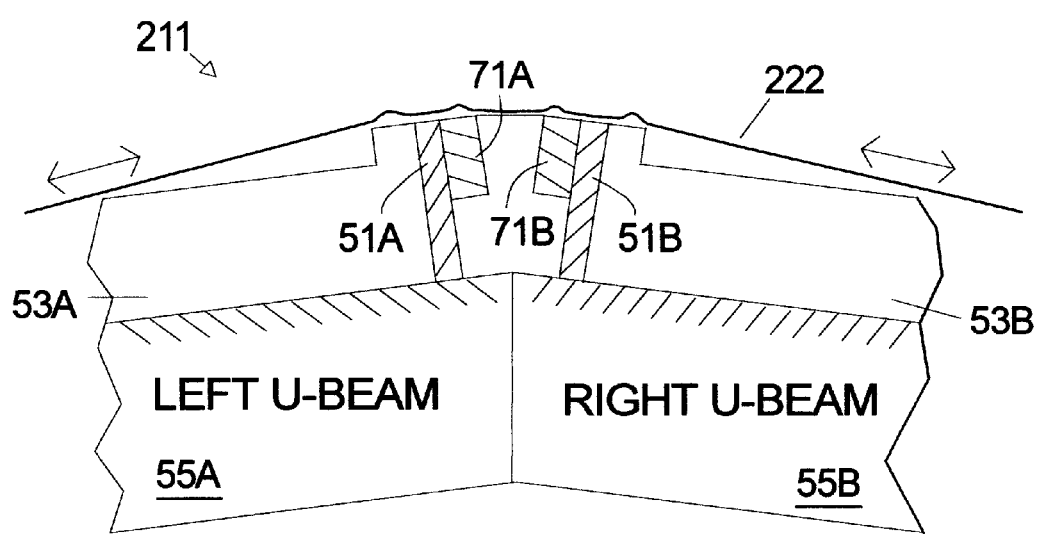
FIG. 4 is symbolic illustration of a prior art tape transducer assembly containing left and right modules.
Figure 5:
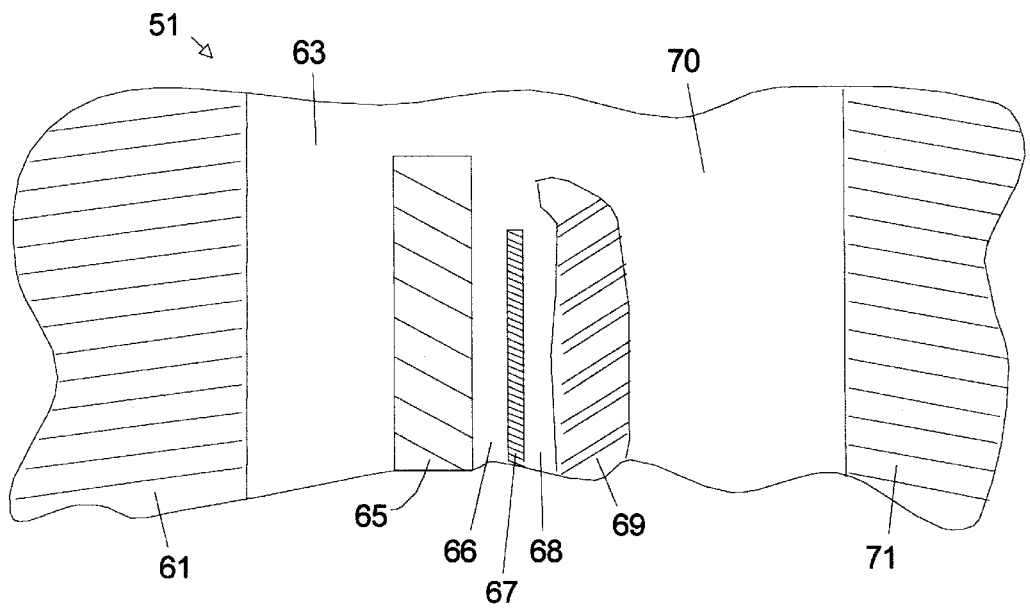
FIG. 5 is symbolic illustration of a section of prior art tape transducer parallel to the tape bearing surface showing the shields and the magnetic sensor element.

The invention relates to the topography of the surface of the magnetic transducer and is independent of the specific details of the magnetic transducer's layers. The following description will include one or more examples of particular magnetic transducer designs, but the invention is not limited to use with these designs.

The relative sizes of the components shown in the figures are not presented according to scale, since the large range of sizes would make the drawing unclear. The relative sizes/thickness of the components are according to prior art principles except where noted below. The hatching lines are not intended to represent the material composition of a structure and are used only to distinguish structures and aid in the explanation of the process.

Figure 6:
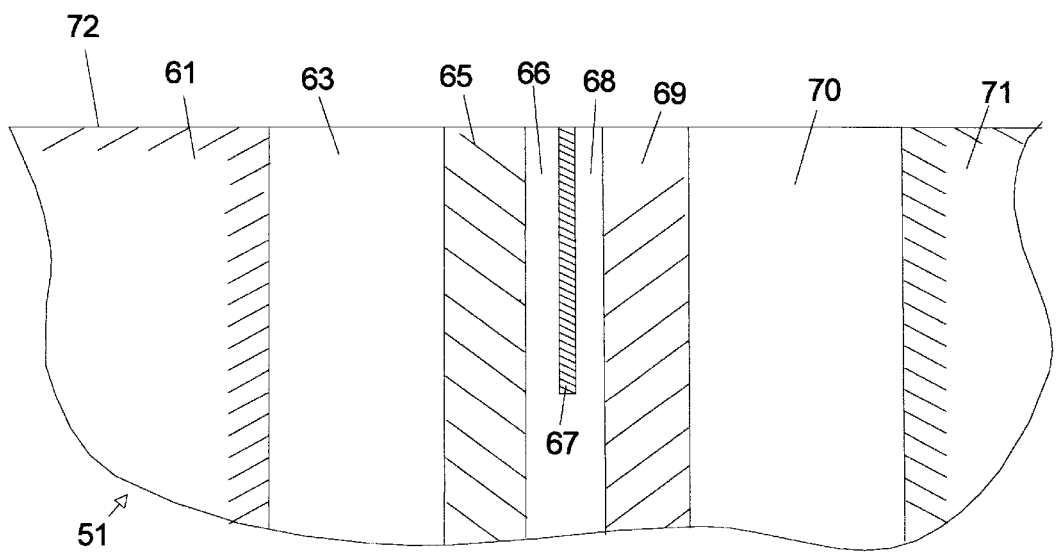
FIG. 6 is symbolic illustration of a section of prior art tape transducer perpendicular to the tape bearing surface showing the shields and the magnetic sensor element.
Figure 7:
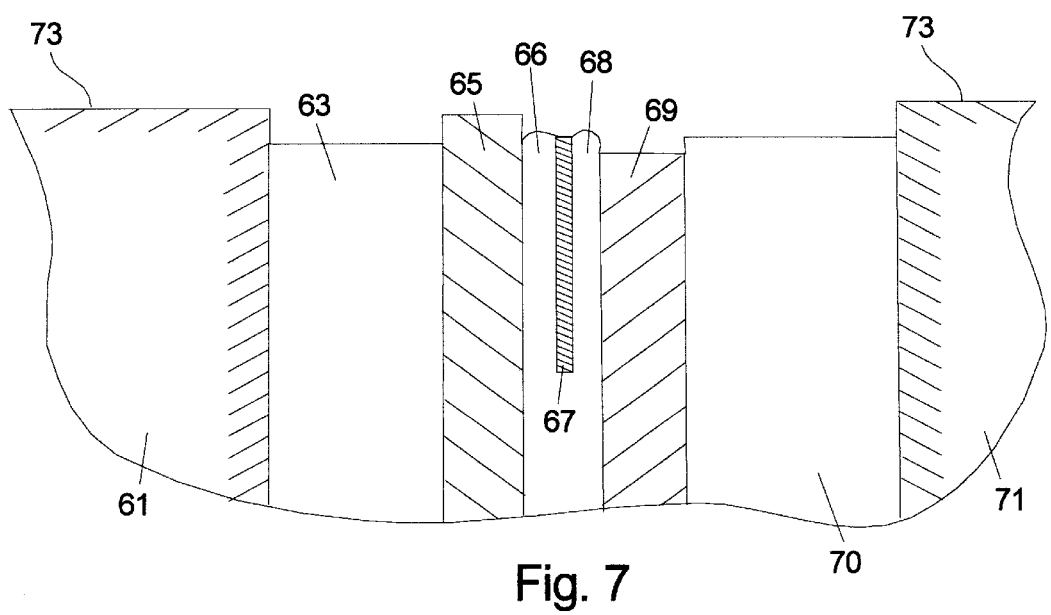
FIG. 7 is symbolic illustration of a section of a tape transducer according to the invention taken perpendicular to the tape bearing surface showing the shields and the magnetic sensor element.

Reference is made to FIG. 7 to describe a transducer assembly 51 according to the invention. The section view is perpendicular to the tape bearing surface (TBS) 73. The elements present in the transducer assembly 51 are the same as those shown in FIGS. 6 and 7, but the surface topography is significantly different. The tape bearing surface 73 is essentially the surfaces of the substrate 61 and the closure piece 71, since all of the intervening components are variously recessed. In the embodiment shown the second shield (S2) 69 is recessed the farthest from the plane of the tape bearing surface, 73. On the right side of the S2 69 the overcoat 70 is closer to the tape bearing, surface 73 than the S2 69, but the overcoat 70 may also be substantially flush with the tape being surface 73. The second gap (G2) 68 is adjacent to S2 69 on the right as shown in FIG. 7. The G2 68 must be above, i.e., closer to the tape than, S2 69 by 10 Angstroms and preferably by approximately 20–30 Angstroms or more. The magnetoresistive sensor element 67 is slightly recessed below the level of G2 68 and G1 66. The level of G2 68 should be at approximately the same level as G1 66. The first shield (S1) 65 is higher than the level of G1 66 in the embodiment in FIG. 7, but the S1 65 may be lower than or the same height as G1 66. The undercoat 63 is recessed below the level of S1 65. The invention recesses the ductile material used in the magnetoresistive sensor element 66 and the S2 69 from the nonductile material on either side to protect the ductile material from the mechanical action of the moving tape. Thus, the heads according to the invention are not subject to having the ductile material distorted into drift-like shapes.

Although the invention does not require any particular dimensions, the following dimensions are given to further illustrate the invention. For a magnetoresistive sensor element 66 which is on the order of 0.1 micron wide at the tape bearing surface, a recessed depth on the order of 50 Angstroms can be used. The S2 69 in the same example could be recessed approximately 100—150 Angstroms.

One method for fabricating a transducer assembly 51 according to the invention uses a reactive lapping process. As noted above the prior art lapping process for tape heads has typically used an inert abrasive slurry to smooth the tape bearing surface of the heads. The lapping process of the invention uses a reactive slurry which differentially attacks the materials comprising the surface of the wafer to cause the selected materials, i.e., the magnetoresistive material of the sensor 67 and S2 69 to be removed at a higher rate than the other materials such as Sendust and alumina. For the typical nickel-iron alloys used for the sensor 67 and S2 69 an acidic slurry is preferred. Phosphoric acid is preferred as the acidifying agent. A pH of from 3 to 7 is preferred with the range of 4 to 5 being more preferred. The acidifying agent can be added to a prior art lapping compound. The final topography of the transducer surface may be adjusted by increasing or decreasing the pH and varying the length of time the lapping is continued.

Known prior art lapping slurries are typically water or glycol based. Either type of slurry may be acidified by adding an acid. In addition, a buffering agent may be added to stabilize the reactivity and pH of the solution during the lapping process.

A second method of forming the structure shown in FIG. 7 uses sputter etching. It is known that different materials sputter etch at differing rates. The absolute rate of etching is determining by many factors such as the sputtering gas species, the pressure of the sputtering gas, and so forth. However, it is only the relative rates of sputter etching that need to be considered in the present discussion. The alumina which is typically used for the undercoat 63 and overcoat 70 etch at what can arbitrarily be called a moderate rate, that is to say that in comparison to the other materials in the transducer assembly 51 the alumina is neither the fastest nor the slowest to etch. The Sendust material used for S1 65 has a lower relative sputter etch rate than alumina. The nickel-iron alloy (Permalloy) which is used for the magnetoresistive sensor element 66 and S1 69 has higher sputter etch rate than either alumina or Sendust. The substrate 61 and the closure piece 71 are typically ceramic materials such as N58 which have a relatively low rate of sputter etching. The result of sputter etching the planar wafer surface containing the structures of the materials described above is that illustrated in FIG. 7. Standard sputter etching techniques can be used. The exact length of time in the sputtering chamber and the pressure of the working gas must be determined empirically, since these parameters may vary significantly depending on the particular sputtering equipment and the particular material compositions being used. Any of the conventional noble gases may be used in the sputter etching, but the preferred sputtering gas species is argon.

Other variations and embodiments according to the invention will be apparent to those skilled in the art that will nevertheless be with the spirit and scope of the invention.

What is claimed is:

1. A magnetic transducer comprising:
    a magnetic sensor element having an upper surface;
    first and second gap layers disposed on parallel sides of the magnetic sensor element and extending above the upper surface of the magnetic sensor element;
    a first shield disposed adjacent to the first gap layer;
    a second shield disposed adjacent to the second gap layer and recessed below the second gap layer; and
    first and second ceramic structures with coplanar surfaces which provide first and second bearing surfaces to support a moving magnetic medium in a bearing plane that is above the first gap layer, the second gap layer and the second shield.

2. The magnetic transducer of claim 1 wherein the first shield is composed of nonductile material and the second shield is composed of ductile material.

3. The magnetic transducer of claim 1 wherein the second shield is composed of an alloy of nickel and iron.

4. The magnetic transducer of claim 1 wherein the first and second gap layers are composed of alumina.

5. The magnetic transducer of claim 1 wherein the second shield is recessed below the second gap layer by at least 10 Angstroms.

6. A tape storage system comprising:
    a magnetic transducer including
        a magnetic sensor element having an upper surface;
        first and second gap layers disposed on parallel sides of the magnetic sensor element and extending above the upper surface of the magnetic sensor element;
        a first shield disposed adjacent to the first gap layer;
        a second shield disposed adjacent to the second gap layer and recessed below the second gap layer; and
        first and second ceramic structures with coplanar surfaces which provide first and second bearing surfaces to support a moving magnetic tape in a bearing plane that is above the first gap layer, the second gap layer and the second shield; and
    means for moving the tape across the magnetic transducer.

7. The tape storage system of claim 6 wherein the first shield is composed of nonductile material and the second shield is composed of ductile material.

8. The tape storage system of claim 7 wherein the second shield is recessed below the second gap layer by at least 10 Angstroms.

9. The tape storage system of claim 6 wherein the second shield is recessed below the second gap layer by at least 10 Angstroms.

* * * * *